United States Patent [19]

TenEyck et al.

[11] 4,442,219

[45] Apr. 10, 1984

[54] TWO PART CASTABLE CERAMIC CEMENT

[75] Inventors: John D. TenEyck, Lewiston; Russell D. Smith, Grand Island; Kurt W. Hoff, Tonawanda, all of N.Y.

[73] Assignee: Kennecott Corporation, Cleveland, Ohio

[21] Appl. No.: 312,586

[22] Filed: Oct. 19, 1981

[51] Int. Cl.$^3$ ............................ C04B 35/02; C04B 35/80
[52] U.S. Cl. ................................. 501/95; 206/524.1; 264/30; 264/333; 501/124; 501/133
[58] Field of Search ................ 106/104, 93, 99; 501/124, 95, 133; 206/219, 524.1; 264/30, 333

[56] References Cited

U.S. PATENT DOCUMENTS

| | | | |
|---|---|---|---|
| 3,458,329 | 7/1969 | Owens et al. | 501/133 X |
| 3,629,116 | 12/1971 | Gartner et al. | 501/95 X |
| 3,999,998 | 12/1976 | Carbonnel et al. | 501/124 X |
| 4,038,093 | 7/1977 | Brooks | 106/93 |
| 4,040,847 | 8/1977 | Miller | 206/524.1 |
| 4,086,097 | 4/1978 | Carbonnel | 501/124 |
| 4,100,242 | 7/1978 | Leach | 264/333 |
| 4,150,189 | 4/1979 | Pusch | 501/124 |
| 4,174,331 | 11/1979 | Myles | 264/30 X |
| 4,240,840 | 12/1980 | Downing et al. | 106/93 |
| 4,248,752 | 2/1981 | Myles | 501/133 X |
| 4,331,773 | 5/1982 | Hongo et al. | 501/128 |
| 4,352,693 | 10/1982 | Langdon | 206/524.1 |

FOREIGN PATENT DOCUMENTS 1591843 6/1981 United Kingdom ................ 106/99

*Primary Examiner*—Helen M. McCarthy
*Attorney, Agent, or Firm*—David M. Ronyak; Paul A. Leipold; Larry W. Evans

[57] ABSTRACT

A two part castable ceramic cement having low density, good thermal shock resistance, good temperature resistance and extended storage life. The first and second parts are mixed together prior to use. The first part is a slurry of solids in water. The solids comprise 0 to 10 weight percent organic fibers, about 35 to about 80 weight percent ceramic organic fibers, about 5 to about 15 weight percent colloidal silica and about 3 to about 10 weight percent organic adhesive. The second part is essentially dry and comprises from about 50 to about 100 weight percent calcium aluminate.

The invention further includes a method for forming the cement by mixing the two parts and includes the cast cement resulting from casting and drying the mixed first and second parts.

10 Claims, No Drawings

TWO PART CASTABLE CERAMIC CEMENT

BACKGROUND OF THE INVENTION (A) Field of the Invention

This invention relates to castable ceramic cements and more particularly relates to such cements which are mixed on site prior to casting and which have high temperature characteristics.

(B) History of the Prior Art

In the prior art, ceramic cements were frequently blended and cast on site. Packaging of such cements usually occurred by blending dry components which were then mixed with water to form the castable cement. Such cements had serious problems since measurement of the amount of water and uniform mixing were difficult to obtain under the variable conditions found outside of cement manufacturing plants or factories.

It has been known that two components mix systems could be prepared wherein one of the components contained a fixed amount of water such that the cement was formed when the wet mix and dry components were blended. Unfortunately, such two component mix systems generally had poor storage life. Such cements having poor storage life are discussed in U.S. Pat. No. 4,174,226. Furthermore, such cements, after casting, had high densities which, in general, resulted in insulation properties which were not as good as desirable. In addition, such cements were found to have poor thermal shock resistance.

BRIEF DESCRIPTION OF THE INVENTION

In accordance with the present invention, there is provided a two part castable ceramic cement wherein first and second parts are mixed together, prior to use, in proportions of the first part to the second part of from 1:3 to 3:1. The first part is a slurry of solids in water wherein the slurried solids comprise 0 to about 10 weight percent of organic fibers, from about 35 to about 80 weight percent ceramic fiber, from about 5 to about 15 weight percent colloidal silica, and from about 3 to about 10 weight percent of organic adhesive. The second part is essentially dry and comprises from about 50 to about 100 weight percent calcium aluminate. The invention further comprises the method for forming the ceramic cement which comprises mixing the first part with the second part and includes the cast cement resulting from casting and drying the mixed first and second compositions.

Two part castable ceramic cement, in accordance with the invention, can be easily uniformly mixed on site, has a storage life measured in years and when cast and dried, results in a high temperature, thermal shock resistant, low density ceramic.

DETAILED DESCRIPTION OF THE INVENTION

The first part of the two part castable ceramic cement, as previously discussed, is a slurry of solids in water wherein the slurried solids comprise from 0 to about 10 weight percent of organic fibers, from about 35 to about 80 weight percent ceramic fiber, from about 5 to about 15 weight percent colloidal silica, desirably from about 0.5 to about 30 weight percent of a high temperature inorganic filler and from about 3 to about 10 percent of an organic adhesive. The slurry usually comprises from about 50 to about 80 weight percent water.

The organic fibers may be any suitable organic fibers, but are generally organic fibers provided by wood pulp, especially kraft wood pulp. Other suitable organic fibers include natural cellulose fibers such as cotton and flax fibers and synthetic or modified natural fibers such as nylon, polyester and modified cellulose fibers. Such fiber may optionally but not desirably be omitted and are usually present in an amount of from about 2 to about 10 weight percent of solids in the slurry.

The ceramic fiber is again any suitable ceramic fiber but is usually a high temperature fiber such as aluminosilicate fibers. Suitable ceramic fibers usually have diameters of from about 0.5 to about 20 microns and lengths of from about 0.5 to about 50 mm. Other ceramic fibers which can be used include basalt rock wool and fiberglass. Asbestos may also be used but is not desirable due to the health problems associated with asbestos and because asbestos, in general, does not have a temperature resistance as high as is desirable in accordance with the present invention. The ceramic fiber is present in an amount of from about 35 to about 80 percent and preferably from about 35 to about 60 percent by weight of solids in the slurry.

The colloidal silica used in accordance with the present invention can be essentially any colloidal silica; however, the most desirable colloidal silicas are those which have the smaller average particle size and which can be easily dispersed. E. I. du Pont de Nemours, Inc. Ludox ® colloidal silica has been found to be particularly suitable.

The organic adhesive can be any desirable organic adhesive including starch or sythetic adhesives such as urethanes or styrene-butadiene rubbers.

The second part of the two part castable ceramic cement is essentially dry and comprises from about 50 to about 100 weight percent calcium aluminate. The remainder, if any, of the second part, in a major proportion, usually comprises a high temperature inorganic filler. "High temperature", as used herein, means the filler or fiber is stable at a temperature above 2250° F. Fillers may also be included in the first part of the two part castable ceramic cement in an amount of from about 0.5 to about 30 percent by weight of solids in the slurry. Suitable fillers are essentially any ceramic filler such as silica, alumina, zirconia or magnesia. The average particle size of the ceramic filler is usually between about 100 and 600 mesh. A particularly desirable filler, for use in accordance with the present invention, has been found to be silica flour having an average particle size of about 200 mesh.

Either the first or second part, or both, may include viscosity modifiers. The second part, for example, may include a viscosity modifier to improve the consistency of the slurry by providing a creamier and smoother texture. Such modifiers also can improve the thixotropic nature of the final blend so that the blend can readily move into depressions in a mold area when the blend is stirred, forced or vibrated within the mold area. Such viscosity modifiers can also associate with water in the slurry so that excess water is unavailable to hydrate the calcium aluminate cement. Examples of such viscosity modifiers are the modified celluloses such as hydroxymethylcellulose, hydroxyethylcellulose and hydroxypropylcellulose. Usually the cement mixture contains 0 to 2 weight percent and preferably from 0.2 to 2 weight percent of such a viscosity modifier.

One of the parts of the two part castable ceramic cement, usually the slurry, may additionally contain a biocide such as sodium benzoate to prevent decomposition of organic components such as starch organic adhesive or wood pulp fiber. Such a biocide is usually present in an amount of less than about 1/10 of 1% by weight of the finished ceramic cement mixture.

As previously discussed, the first and second parts are mixed together, prior to use, in proportions of the first part to the second of from 1:3 to 3:1 to form the castable ceramic cement mixture. The mixing may be accomplished by any suitable means such as an agitator, blender or by manual stirring.

After the ceramic cement is mixed, cast and dried, the density is found to be from about 40 to about 60 lbs. per cubic ft. and despite its low density, its modulus of rupture is found to be in excess of about 65 lbs. per sq. in. In addition, the cast ceramic cement retains substantially in excess of 50% of its modulus of rupture even after five cycles of heating to 1800° F. followed by cooling to ambient temperature. This percent retention of modulus of rupture, after such thermal shock resistance testing, is high when compared with prior art cast cements. Furthermore, the cast cement of the invention has a relatively low percent linear shrinkage when compared with prior art cast ceramic cements having comparably low densities. The cast ceramic cement of the invention further has a lower density than most other prior art castable ceramic cements and, as a result, is believed to have better insulating properties.

The following examples serve to illustrate and not limit the present invention. Unless otherwise indicated, all parts and percentages are by weight.

EXAMPLE I (a) Castable cement, part 1. (wet)

21.44 lbs. of kraft pulp is dispersed into approximately 50 gallons of $H_2O$ and then is placed in a mix tank capable of holding 2500 gallons of $H_2O$. 2000 gallons of $H_2O$ is added and then, in order, 200 lbs. ceramic fiber, 100 lbs. silica flour 20.9 lbs. starch and 41.9 lbs. colloidal silica (solids weight) are added.

The resulting mix, having a solids content of about 2%, is then further diluted to about a 0.5% solids before being formed into a wet felt of a paper machine. The wet felt is dewatered by a vacuum until the product contains 67% water. (This amount of water provides for uniform mixing with dry part 2., but not enough to overhydrate the cement). The wet felt is then packaged, either as is, or in shredded form, into impermeable plastic containers. Biocide is added at the time of packaging.

The solids in the resulting part 1. wet mix are as follows:

| COMPONENT | WEIGHT PERCENT |
|---|---|
| kraft pulp | 5.46 |
| ceramic fiber | 50.96 |
| silica flour (290 mesh) | 25.51 |
| starch | 5.32 |
| colloidal silica | 12.75 |
| | 100.00 |

(b) Castable cement, part 2. (dry)

A dry mix is prepared by weighing 915 lbs. calcium aluminate cement, 366 lbs. of silica flour (290 mesh), and 25 lbs. of hydroxyethylcellulose from Hercules, Inc. and then blending them together in a suitable dry type mixer.

The finished product is prepared by mixing about 0.6 lbs. of dry mix to each lb. of wet mix in a cement type mixer for about 5 minutes. The mix is then ready for use and can be cast, troweled or tamped into a mold.

The cured finished product of this example of the invention is tested for physical properties. The cement is found to have a density (about 48 lbs./cu.ft.) which is lower than other commercial refractory castable cements tested and is found to have a better thermal shock resistance (about 57% retained modulus of rupture after 5 cycles from 1800° F. to ambient temperature) than other commercial refractory castable cements tested. The product of the invention is also found to have an indefinite storage life which is better than other refractory ceramic cements.

The lower density indicates that there would be better insulation properties and the improved thermal shock resistance indicates that there would be an extended use life.

What is claimed is:

1. A two part castable ceramic cement wherein the first and second parts are mixed together, prior to use, in proportions of the first part to the second part of from 1:3 to 3:1; said first part being a partially dewatered slurry of about 50 to about 20 weight percent solids in water wherein the slurried solids consist essentially of from about 5 to about 15 weight percent colloidal silica, from about 3 to about 10 weight percent of an organic adhesive, from about 2 to about 10 weight percent of organic fibers, from about 35 to about 60 weight percent ceramic fiber and from about 0.5 to about 30 weight percent of a high temperature inorganic filler; said second part being essentially dry and comprising from about 50 to about 100 weight percent calcium aluminate, the majority of the remainder said second part being a high temperature inorganic filler.

2. The castable ceramic cement of claim 1 wherein the organic fibers are cellulose fibers provided by wood pulp.

3. The cement of claim 1 wherein the filler in the first and second parts is silica flour.

4. The castable cement of claim 1 wherein the high temperature filler in the second part is silica flour.

5. The castable cement of claim 1 wherein the cement contains 0.2 to 2 weight percent of a viscosity modifier comprising modified cellulose.

6. The cement of claim 5 wherein the modified cellulose modifier is hydroxypropyl cellulose.

7. A cast ceramic cement comprising the mixed, cast and dried castable ceramic cement of claim 1.

8. The cast cement of claim 7 wherein the density of the cast and dried cement is from 40 to 60 pounds per cubic foot, its modulus of rupture is in excess of 65 pounds per square inch and it retains in excess of 50 percent of its initial modulus of rupture after five cycles of heating to 1800° F. followed by cooling to ambient temperature.

9. A method for forming a castable ceramic cement which comprises mixing a first composition with a second composition in proportions of said first composition to said second composition of from 1:3 to 3:1 wherein said first composition is a partially dewatered slurry of about 50 to about 20 weight percent solids in water wherein said solids do not contain cement and comprise from about 5 to about 15 weight percent colloidal silica, from about 3 to about 10 weight percent of an organic adhesive, from about 2 to about 10 weight percent of organic fibers, from about 35 to about 65 weight percent ceramic fiber and from about 0.5 to about 30 percent of a high temperature inorganic filler; and wherein said second composition is essentially dry prior to mixing and comprises from about 50 to about 100 weight percent calcium aluminate with the majority of the remainder said second part being a high temperature inorganic filler.

10. The method of claim 9 wherein the organic fibers are cellulose fibers provided by wood pulp.

* * * * *